United States Patent
Buttolo et al.

(10) Patent No.: US 9,656,592 B1
(45) Date of Patent: May 23, 2017

(54) SYSTEM AND METHOD OF CALIBRATING A VEHICLE BADGE HAVING A NUMBER OF LIGHT SOURCES

(71) Applicant: Ford Global Technologies, LLC, Dearborn, MI (US)

(72) Inventors: Pietro Buttolo, Dearborn Heights, MI (US); Stuart C. Salter, White Lake, MI (US); Paul Kenneth Dellock, Northville, MI (US); James J. Surman, Clinton Township, MI (US); James Stewart Rankin, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/067,709

(22) Filed: Mar. 11, 2016

(51) Int. Cl.
| | |
|---|---|
| *B60Q 1/14* | (2006.01) |
| *B60Q 1/00* | (2006.01) |
| *B60Q 1/50* | (2006.01) |
| *B60Q 1/26* | (2006.01) |
| *B60R 13/00* | (2006.01) |
| *H05B 37/02* | (2006.01) |

(52) U.S. Cl.
CPC ......... *B60Q 1/0076* (2013.01); *B60Q 1/2607* (2013.01); *B60Q 1/50* (2013.01); *B60R 13/005* (2013.01); *H05B 37/0227* (2013.01)

(58) Field of Classification Search
CPC ..... F21V 23/02; F21V 25/12; H05B 37/0236; A63J 17/00; F21L 14/026
USPC ..................... 315/76, 77, 78, 79, 80, 82, 84
See application file for complete search history.

(56) References Cited

U.S. PATENT DOCUMENTS

| | | | |
|---|---|---|---|
| 4,099,172 | A | 7/1978 | Montanari et al. |
| 5,973,656 | A | 10/1999 | Yokoi et al. |
| 6,729,738 | B2 | 5/2004 | Fuwausa et al. |
| 6,773,129 | B2 | 8/2004 | Anderson, Jr. et al. |
| 6,871,986 | B2 | 3/2005 | Yamanaka et al. |
| 6,990,922 | B2 | 1/2006 | Ichikawa et al. |
| 7,213,923 | B2 | 5/2007 | Liu et al. |
| 7,264,366 | B2 * | 9/2007 | Hulse ........................ F21V 9/16 362/231 |
| 7,264,367 | B2 | 9/2007 | Hulse |
| 7,753,541 | B2 | 7/2010 | Chen et al. |
| 7,834,548 | B2 | 11/2010 | Jousse et al. |
| 7,978,152 | B2 | 7/2011 | Huang |
| 8,016,465 | B2 | 9/2011 | Egerer et al. |
| 8,071,988 | B2 | 12/2011 | Lee et al. |
| 8,203,260 | B2 | 6/2012 | Li et al. |

(Continued)

FOREIGN PATENT DOCUMENTS

| | | |
|---|---|---|
| CN | 201169230 Y | 2/2009 |
| CN | 201193011 Y | 2/2009 |

(Continued)

*Primary Examiner* — Minh D A
(74) *Attorney, Agent, or Firm* — Jason Rogers; Price Heneveld LLP

(57) ABSTRACT

A system and method for calibrating a vehicle badge having a number of light sources is provided herein. A display displays a lighting sequence of a virtual badge. A sensor captures images of the lighting sequence at specified time intervals. A controller calibrates the light sources to match the captured lighting sequence at each time interval. A computing device utilizes calibration data to generate a code stored on the controller to control the light sources to reproduce the lighting sequence.

20 Claims, 6 Drawing Sheets

(56) References Cited

U.S. PATENT DOCUMENTS

| | | |
|---|---|---|
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,631,598 B2 | 1/2014 | Li et al. |
| 8,724,054 B2 | 5/2014 | Jones |
| 8,773,012 B2 | 7/2014 | Ryu et al. |
| 8,816,586 B2 | 8/2014 | Marcove et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2009/0219730 A1 | 9/2009 | Syfert et al. |
| 2012/0001406 A1 | 1/2012 | Paxton et al. |
| 2013/0335994 A1 | 12/2013 | Mulder et al. |
| 2014/0266666 A1 | 9/2014 | Habibi |

FOREIGN PATENT DOCUMENTS

| | | |
|---|---|---|
| DE | 29708699 U1 | 7/1997 |
| DE | 10319396 A1 | 11/2004 |
| DE | 102009002125 A1 | 10/2010 |
| EP | 1793261 A1 | 6/2007 |
| EP | 2778209 A1 | 9/2014 |
| JP | 2000159011 A | 6/2000 |
| WO | 2006047306 A1 | 5/2006 |
| WO | 2014068440 A1 | 5/2014 |

\* cited by examiner

SYSTEM AND METHOD OF CALIBRATING A VEHICLE BADGE HAVING A NUMBER OF LIGHT SOURCES

FIELD OF THE INVENTION

The present disclosure generally relates to vehicle badges having a number of light sources, and more particularly, to calibrating the number of light sources to reproduce a desired lighting sequence.

BACKGROUND OF THE INVENTION

Some vehicle badges employ one or more light sources to effectuate a variety of lighting effects. Accordingly, a need arises for a means to precisely calibrate the light sources to reproduce said lighting effects.

SUMMARY OF THE INVENTION

According to one aspect of the present invention, a method for calibrating a vehicle having a number of light sources is provided. The method includes displaying a lighting sequence of a virtual badge; capturing the lighting sequence at specified time intervals using a sensor; calibrating the number of light sources of a vehicle badge to match the captured lighting sequence at each time interval; utilizing calibration data to generate a code to control the light sources to reproduce the lighting sequence; and storing the code on a controller of the vehicle badge.

According to another aspect of the present invention, a system for calibrating a vehicle badge having a number of light sources is provided. A display displays a lighting sequence of a virtual badge. A sensor captures images of the lighting sequence at specified time intervals. A controller calibrates the light sources to match the captured lighting sequence at each time interval. A computing device utilizes calibration data to generate a code stored on the controller to control the light sources to reproduce the lighting sequence.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure is related to an illuminated badge that may be attached to a vehicle. The disclosure is also related to a system and method for calibrating the badge in order to reproduce a desired lighting sequence.

Figure 1:
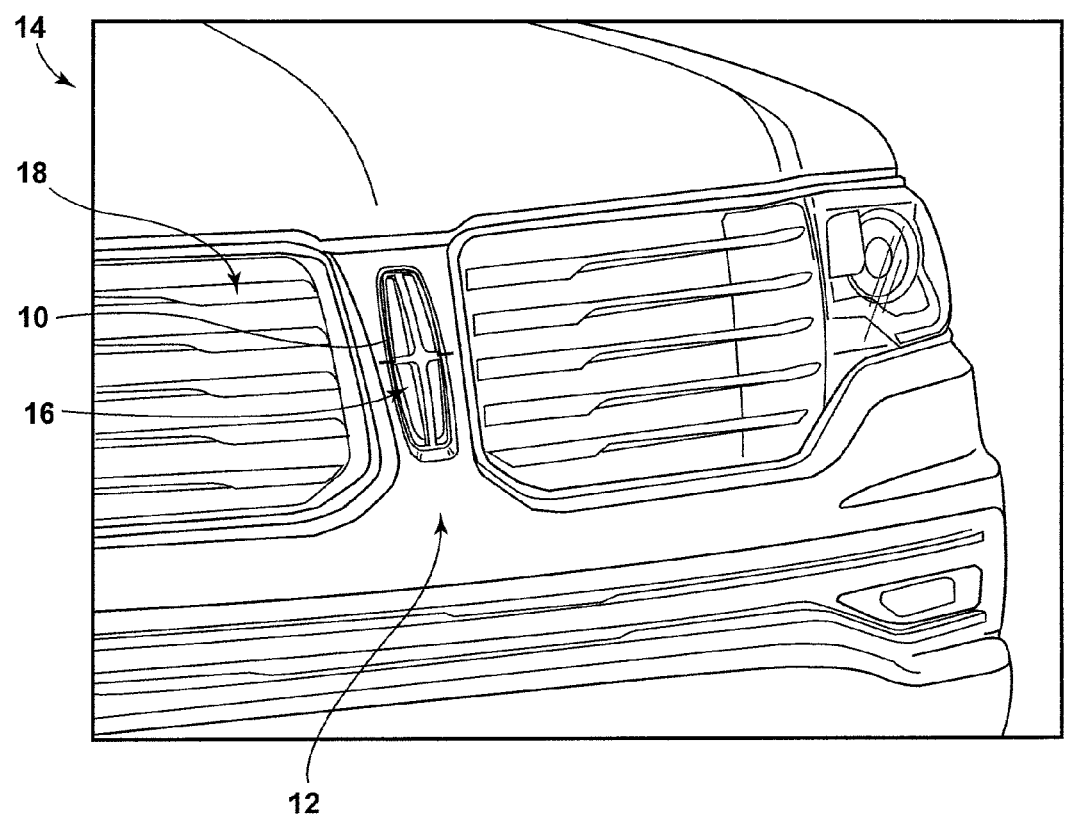
FIG. 1 is a front perspective view of a vehicle equipped with an illuminated badge on a grille assembly of a vehicle, according to one embodiment.

Referring now to FIG. 1, a badge 10 is generally shown mounted on a front portion 12 of a vehicle 14. In other embodiments, the badge 10 may be located elsewhere, such as, but not limited to, other locations of the front portion 12, a side portion, or a rear portion of the vehicle 14. Alternatively, the badge 10 may be disposed inside the vehicle 14. The badge 10 may be configured as an insignia that is presented as an identifying mark of a vehicle manufacturer and includes a viewable portion 16 that is generally prominently displayed on the vehicle 14. In the presently illustrated embodiment, the badge 10 is centrally located on a grille assembly 18 of the vehicle 14, thus allowing the badge 10 to be readily viewed by an observer looking head-on at the vehicle 14. As will be described below in greater detail, one or more light sources may be disposed within the badge 10 and may illuminate portions of the viewable portion 16 to provide a distinct styling element to the vehicle 14.

Figure 2:
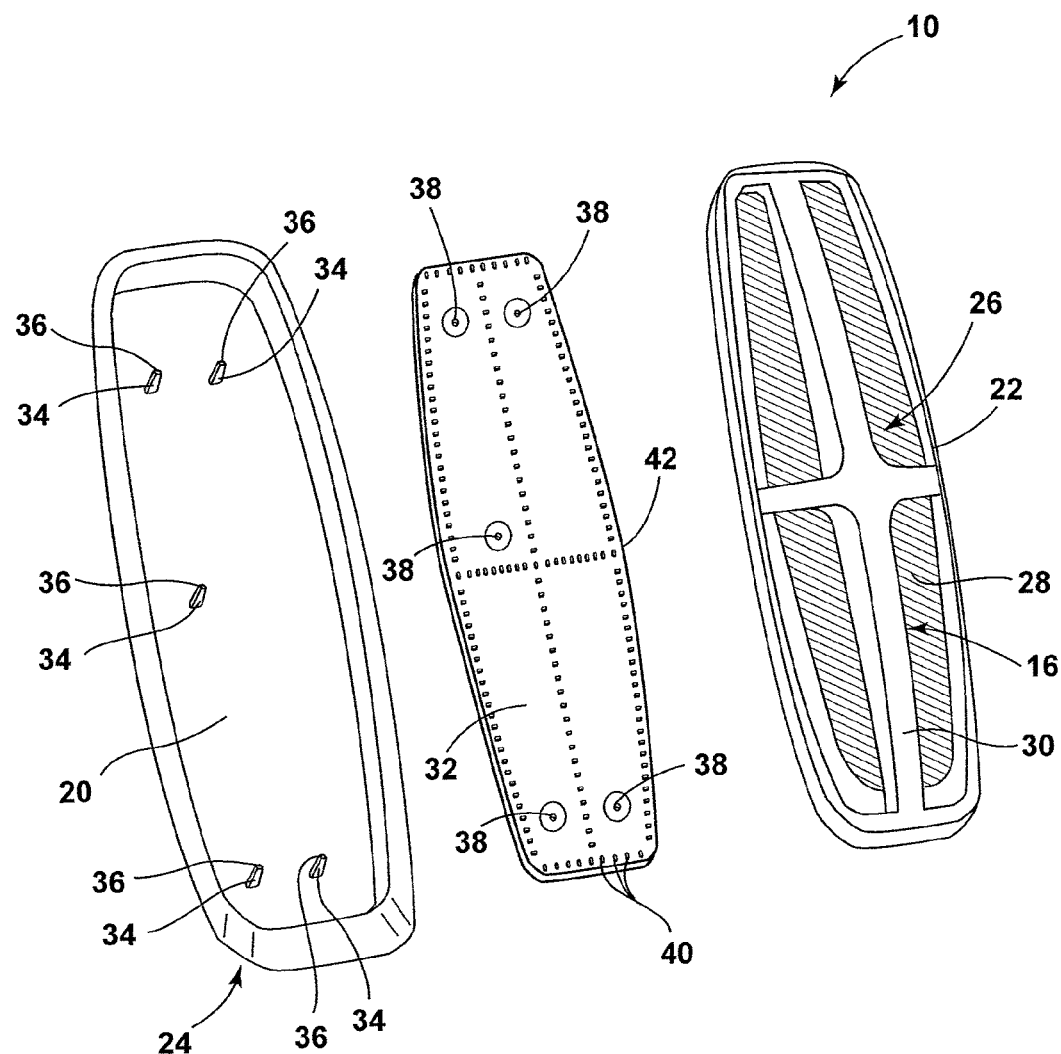
FIG. 2 is an exploded view of the badge, according to one embodiment.

Referring to FIG. 2, the badge 10 is shown, according to one embodiment, having a substrate 20 that may be attached to a housing 22. The substrate 20 may form a rear portion 24 of the badge 10 and may be capable of being secured to the vehicle 14 via any suitable means known in the art. The housing 22 may include the viewable portion 16 centrally located on a forward portion 26 thereof. The viewable portion 16 may include a background region 28 and indicia 30. The indicia 30 may signify the make, model, or any other information that may be desirable to confer about the vehicle 14 upon which the badge 10 is attached to. The viewable portion 16 may include a transparent and/or translucent portion and one or more substantially opaque portion(s), which may be configured as opaque coatings applied to the viewable portion 16. In alternative embodiments, some, or all, of the viewable portion 16 may be left open to the front portion 12 of the vehicle 14. According to one embodiment, the background region 28 may be opaque or light-blocking whereas the portion associated with the indicia 30 is illuminable.

According to one embodiment, the housing 22 and/or the substrate 20 may be constructed from a rigid material such as, but not limited to, a polymeric material and may be assembled to one another via sonic welding, laser welding, vibration welding, injection molding, or any other process known in the art. Alternatively, the housing 22 and the substrate 20 may be assembled together via the utilization of adhesives and/or fasteners. Alternatively still, the housing 22 and substrate 20 may be integrally formed as a single component.

With further reference to FIG. 2, a printed circuit board (PCB) 32 may be secured between the substrate 20 and housing 22. According to one embodiment, the substrate 20 includes a plurality of raised platform 34. A fastener hole 36 is defined in each platform 34 and a plurality of corresponding through holes 38 is defined by the PCB 32. Accordingly, a plurality of complimentary mechanical fasteners (not shown) may be inserted through the through holes 38 of the PCB 32 and mechanically engaged to the fastener holes 36 for removably fixing the PCB 32 to the substrate 20.

Figure 3:
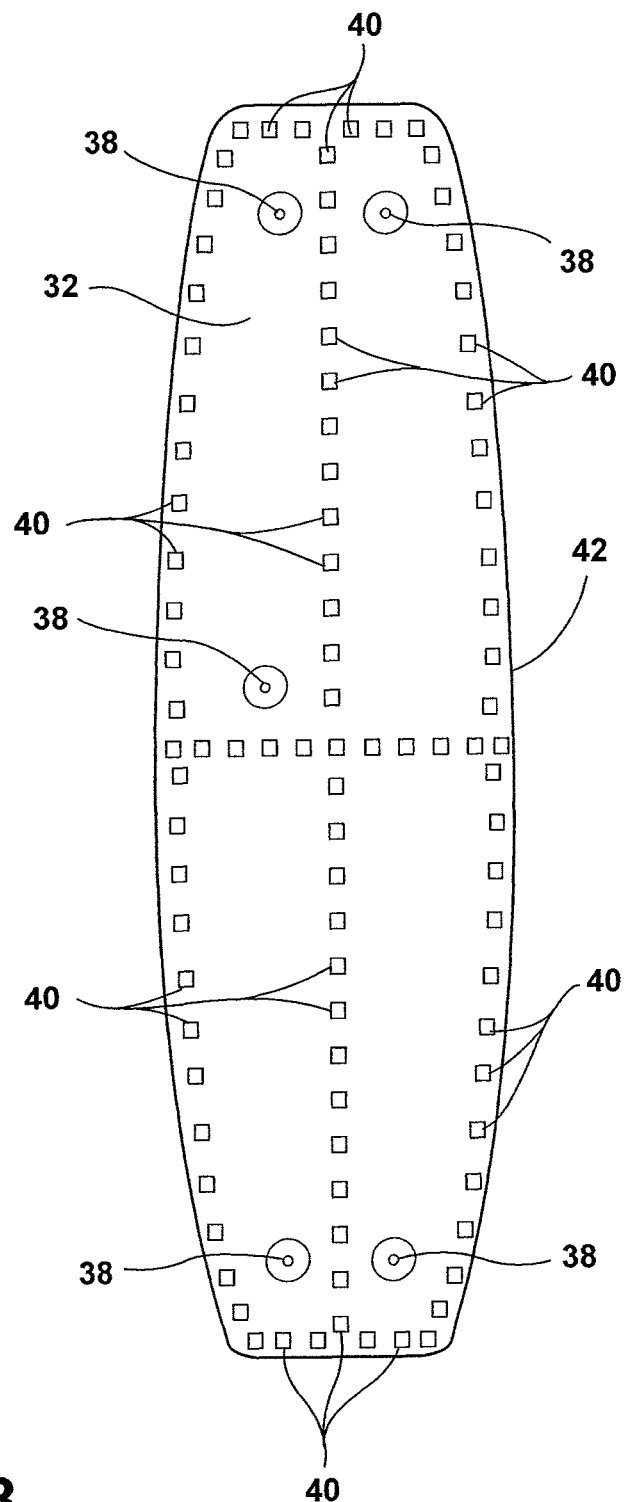
FIG. 3 is a front perspective view of a printed circuit board disposed within the badge having a plurality of light sources thereon, according to one embodiment.

Referring to FIGS. 2 and 3, the PCB 32 may have a plurality of light sources 40 disposed thereon in a variety of patterns. The light sources 40 may include any form of light source. For example, fluorescent lighting, light emitting diodes (LEDs), organic LEDs (OLEDs), polymer LEDs (PLEDs), solid state lighting, or any other form of lighting configured to emit light may be utilized. In some embodiments, a reflective (e.g., white) solder mask may be applied to the PCB 32 to reflect light incident thereon. In the present embodiment, a portion of the light sources 40 are spaced about a peripheral edge 42 while another portion of the light sources 40 are spaced vertically and horizontally across the PCB 32 in a cross-like arrangement. In operation, the light sources 40 may each be independently activated to emit light in a variety of colors at variable intensity. The light sources 40 may be activated concurrently or at different time intervals to exhibit different lighting effects. For example, the light sources 40 spaced about the peripheral edge 42 may be activated in sequence followed by the light sources 40 spaced vertically and horizontally. It is to be understood, however, that various lighting sequences are achievable in alternative embodiments.

Figure 4:
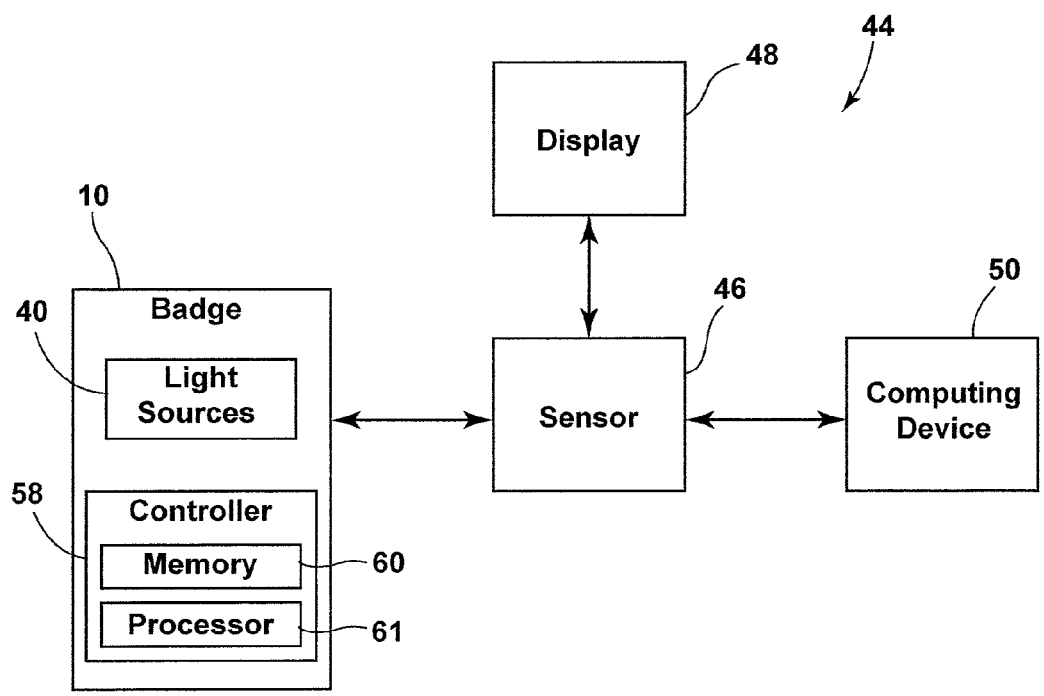
FIG. 4 is a block diagram of a calibration system according to one embodiment.

Referring to FIG. 4, a block diagram of a calibration system 44 is shown according to one embodiment. The system 44 includes a badge (e.g., badge 10), a sensor 46, a display 48, and a computing device 50. For purposes of illustration and understanding, the system 44 will be described with reference to a calibration method 52 shown in FIG. 5. As described in greater detail below, the method 52 details the steps taken to generate a code for controlling the light sources 40 of the badge 10 to mirror a desired lighting sequence shown on the display 48. By adopting the method 52 described herein, a user is able to create and test a variety of desired lighting sequences in a simple and time efficient manner. As an added benefit, issues related to LED binning, unregulated electronics (e.g., variations in resistors, capacitors, transistors, etc.), and imperfections (e.g., spacing, thickness, color, opacity, etc.) related to badge componentry can be drastically reduced.

Figure 5:
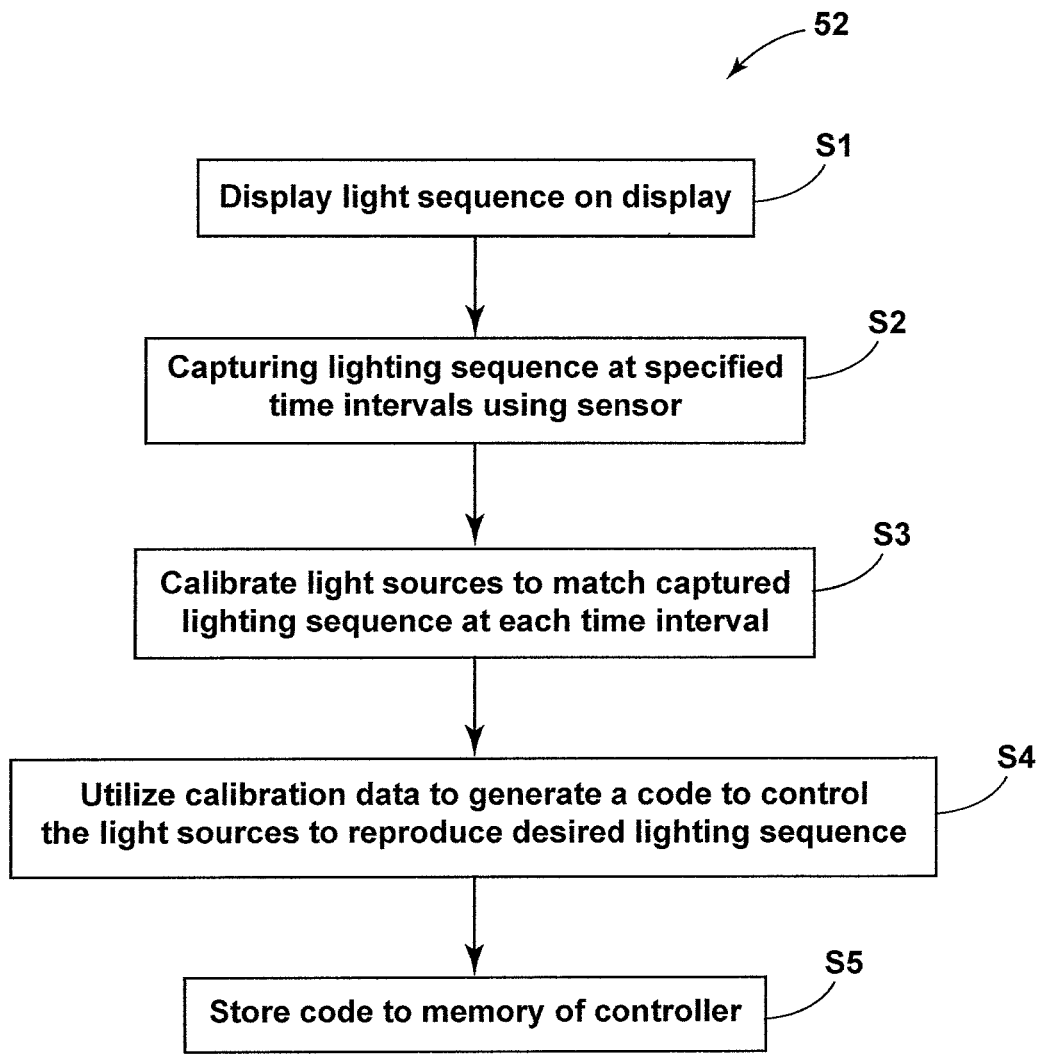
FIG. 5 is a flow diagram of a calibration method according to one embodiment.
Figure 6:
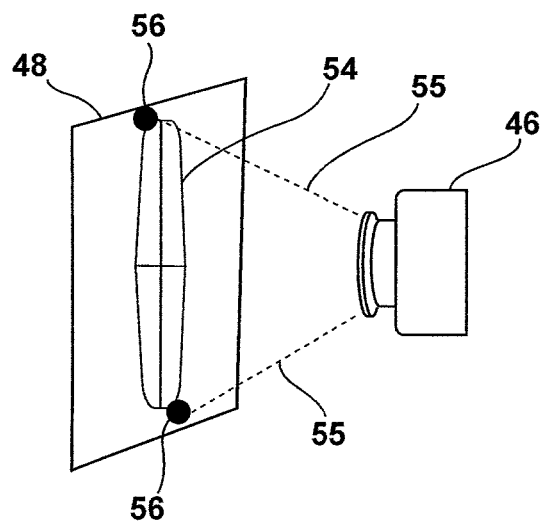
FIG. 6 illustrates a sensor capturing images of the lighting sequence of a virtual badge displayed on a display.

With reference to FIGS. 4 and 5, the method 52 may begin by displaying a lighting sequence on the display 48 (step S1) and capturing the lighting sequence at specified time intervals using the sensor 46 (step S2). As described herein, a variety of lighting sequences are possible for a given badge having one or more light sources. For exemplary purposes, a virtual badge 54 made in the likeness of badge 10 is shown on the display 48 in FIG. 6. As shown, the sensor 46, which may be embodied as a time lapse camera, has a field of view 55 that is aligned with the display 48 using a set of markers 56. In the illustrated embodiment of FIG. 6, one of the markers 56 may be disposed proximate and leftward of an upper extent of the virtual badge 54 while the other of the markers 56 may be disposed proximate and rightward of a lower extent of the virtual badge 54. However, the markers 56 may be located in other locations in alternative embodiments based on the configuration of the badge. Also, additional markers may be used if desired. The markers 56 may be generated on the display 48 or otherwise disposed directly onto the screen at the chosen locations. In alternative embodiments, the sensor 46 may be embodied as an RGB light sensor. The sensor 46 should be generally configured to capture the entire lighting sequence at a desired time interval depending on how quickly the lighting sequence changes. Typically, the sampling rate of the sensor 46 should be at least twice the maximum frequency of the lighting sequence and preferably at least ten times the maximum frequency of the lighting sequence.

Figure 7:
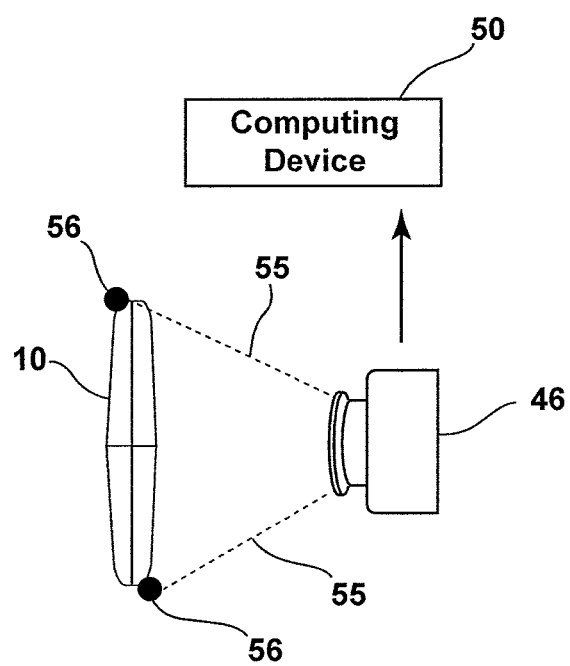
FIG. 7 illustrates the sensor capturing images of the badge and supplying the captured images to a computing device so that a comparison can be made between the captured images of the badge and the captured images of the virtual badge.

Once the entire lighting sequence has been captured by the sensor 46, the light sources 40 of the badge 10 may be calibrated to match the captured lighting sequence at each time interval (step S3). The badge 10 may include a controller 58 having a memory 60 with instructions stored thereon that are executed by a processor 61. Accordingly, the method 52 described herein may be embodied as instructions stored on the memory 60 and executed by the processor 61. In one embodiment, the controller 58 is configured to step through each frame of the captured lighting sequence. While doing so, the sensor 46 captures images of the badge 10 and supplies the captured images to the computing device 50 as represented in FIG. 7. The controller 58 may be located on the PCB 32 or elsewhere on the vehicle 14 and may correspond to a vehicle controller in some embodiments. As the controller 58 steps through a given frame, the voltage/current supplied to the light sources 40 is increased by the controller 58 one light source 40 at a time until the lighting characteristics exhibited by the badge 10 matches that of the virtual badge 54 for the given frame. As described herein, the lighting characteristics may include, but are not limited to, a specific color and/or light intensity. The comparison of the lighting characteristics may be performed by the computing device 50 by analyzing images of the badge 10 that are captured by the sensor 46 and comparing the captured images of the badge 10 to the captured lighting sequence of the virtual badge 54 for the given frame. To ensure compatibility between the captured images of the badge 10 and the corresponding captured lighting sequence for a given frame, the field of view 55 of the sensor 46 is aligned with the badge 10 using the markers 56 described herein. While not shown, the badge 10 may temporarily affixed to a support throughout the calibration process.

When the lighting characteristics of the badge 10 match that of the captured lighting sequence for the given frame, the computing device 50 prompts the controller 58 to step through to a new frame (i.e., the next frame) and the foregoing calibration process is repeated to match the lighting characteristics of the badge 10 to that of the captured lighting sequence for the new frame. In some embodiments, the calibration process may be performed a number of times for each frame to allow a user to fine tune the lighting characteristics of the badge 10 with respect to each frame. For example, when the lighting characteristics of the badge 10 match that of the captured lighting sequence for a given frame, the controller 58 may be configured to perform a second pass for that same frame. On the second pass, the controller 58 activates the light sources 40 to exhibit the matched lighting characteristics determined during the initial pass. From there, the computing device 50 again compares captured images of the badge 10 to the captured lighting sequence of the virtual badge 54 for the given frame and may adjust the lighting characteristics of the badge 10 by increasing and/or decreasing the voltage/current to one or more of the light sources 40 so that a more precise match can be made. Once the lighting characteristics of the badge 10 match that of the captured lighting sequence for the given frame on the second pass and the adjustments to the lighting characteristics of the badge 10 are below a predetermined threshold (e.g., 10% intensity) of the lighting characteristics determined in the previous pass, the controller 58 may then step through to a new frame. Otherwise, if the adjustments to the lighting characteristics of the badge 10 meet or exceed the predetermined threshold, an additional number of passes can be made for the given frame until the threshold condition is satisfied.

Once the controller 58 has stepped through each frame and the lighting characteristics of the badge 10 have been matched to that of each frame, the computing device 50 will have amassed calibration data, which may be utilized to generate a code to control the light sources 40 to reproduce the desired lighting sequence (step S4). The code may then be stored to the memory 60 of the controller 58 (step S5) as instructions executed by the processor 61. According to one embodiment, the calibration data may take on the form of an array of voltages/currents for each light source 40 at each time interval. If necessary, the array may be processed by the computing device 50 using polynomial interpolation through a cloud of points in order to reduce the number of frames that need to be rendered by the controller 58 of the badge 10. Frame reduction may continue until the data needed to render the frames can be stored to the memory 60 of the controller 58.

It important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method comprising the steps of:
    displaying a lighting sequence of a virtual badge;
    capturing the lighting sequence at specified time intervals using a sensor;
    calibrating a number of light sources of a vehicle badge to match the captured lighting sequence at each time interval;
    utilizing calibration data to generate a code to control the light sources to reproduce the lighting sequence; and
    storing the code on a controller of the vehicle badge.

2. The method of claim 1, wherein the sensor is one of a time lapse camera and an RGB sensor.

3. The method of claim 2, wherein the sampling rate of the sensor is at least twice the maximum frequency of the lighting sequence.

4. The method of claim 1, wherein the step of calibrating includes the step of using the controller to step through each frame of the captured lighting sequence while capturing images of the badge with the sensor.

5. The method of claim 4, wherein the controller increases at least one of a voltage and a current supplied to the light sources one light source at a time until a lighting characteristic exhibited by the badge matches that of the lighting sequence of the virtual badge for a given frame.

6. The method of claim 5, wherein when the lighting characteristics of the badge match that of the captured lighting sequence of the virtual badge for the given frame, the controller initiates a second pass for the given frame by activating the light sources to exhibit the previously matched lighting characteristics for the given frame and subsequently adjusts at least one of the voltage and the current supplied to one or more of the light sources until the adjustments are below a predetermined threshold before stepping through to a new frame.

7. The method of claim 6, wherein the lighting characteristic includes at least one of a light intensity and a color.

8. The method of claim 6, wherein the captured images of the badge are supplied to a computing device configured to compare the lighting characteristic of the imaged badge with that of the lighting sequence of the virtual badge on a frame-by-frame basis.

9. The method of claim 8, wherein the calibration data includes an array of at least one of voltages and currents for each light source at each time interval.

10. The method of claim 9, wherein the array is processed by the computing device using polynomial interpretation to reduce the number of frames rendered by the controller.

11. A system comprising:
    a vehicle badge having a number of light sources;
    a display for displaying a lighting sequence of a virtual badge;
    a sensor for capturing the lighting sequence at specified time intervals;
    a controller for calibrating the light sources to match the captured lighting sequence at each time interval; and
    a computing device for utilizing calibration data to generate a code stored on the controller to control the light sources to reproduce the lighting sequence.

12. The system of claim 11, wherein the sensor is one of a time lapse camera and an RGB sensor.

13. The system of claim 12, wherein the sampling rate of the sensor is at least twice the maximum frequency of the lighting sequence.

14. The system of claim 11, wherein the controller steps through each frame of the captured lighting sequence while the sensor captures images of the badge.

15. The system of claim 14, wherein the controller increases at least one of a voltage and a current supplied to the light sources one light source at a time until a lighting characteristic exhibited by the badge matches that of the lighting sequence of the virtual badge for a given frame.

16. The system of claim 15, wherein when the lighting characteristics of the badge match that of the captured lighting sequence of the virtual badge for the given frame, the controller initiates a second pass for the given frame by activating the light sources to exhibit the previously matched lighting characteristics for the given frame and subsequently adjusts at least one of the voltage and the current supplied to one or more of the light sources until the adjustments are below a predetermined threshold before stepping through to a new frame.

17. The system of claim 16, wherein the lighting characteristic includes at least one of a light intensity and a color.

18. The system of claim 16, wherein the captured images of the badge are supplied to a computing device configured to compare the lighting characteristic of the imaged badge with that of the lighting sequence of the virtual badge on a frame-by-frame basis.

19. The system of claim 18, wherein the calibration data includes an array of at least one of voltages and currents for each light source at each time interval.

20. The system of claim 19, wherein the array is processed by the computing device using polynomial interpretation to reduce the number of frames rendered by the controller.

* * * * *